Figure 1:
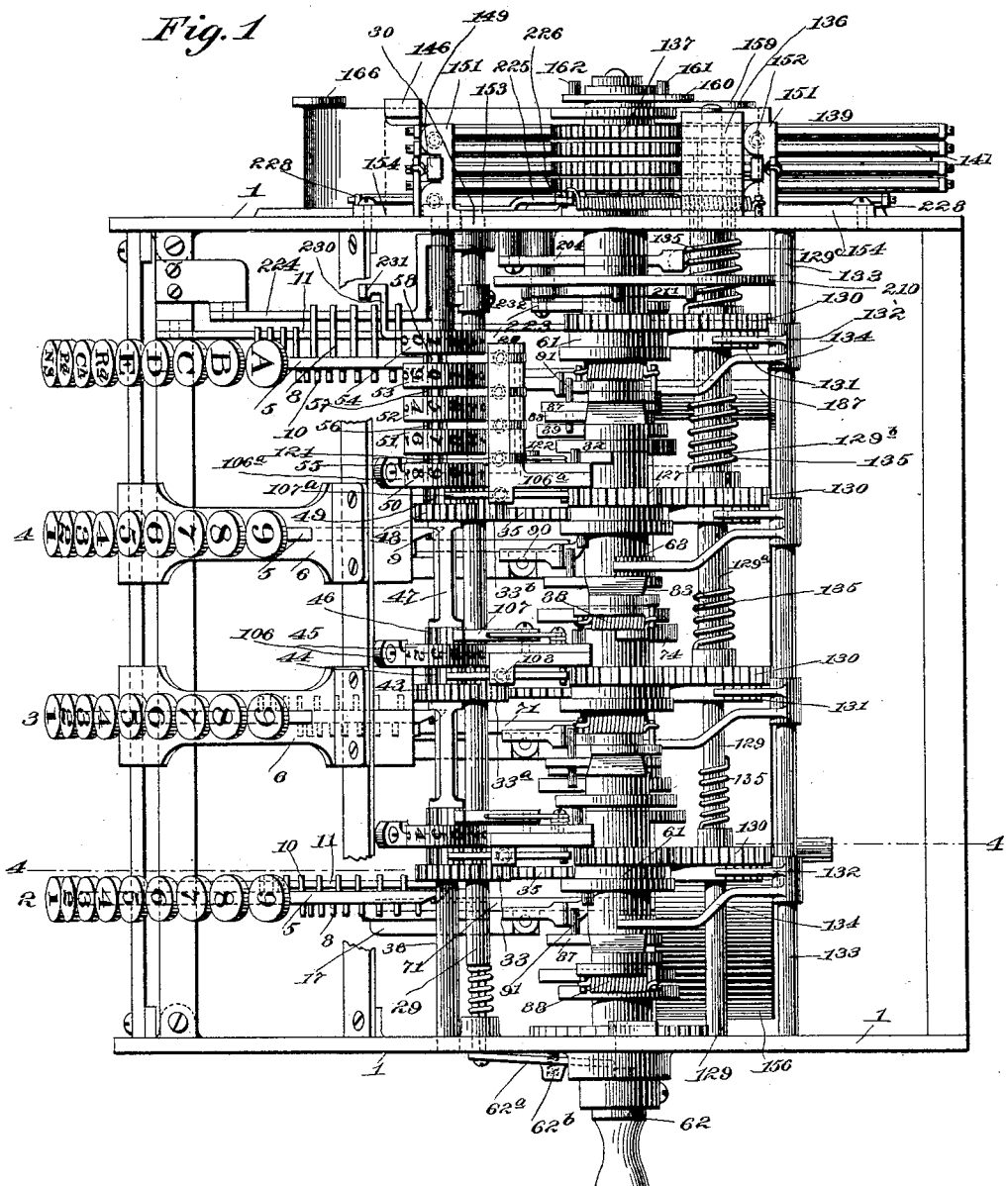

(No Model.) 6 Sheets—Sheet 1.

J. SHARPE & J. A. BANFIELD.
CASH REGISTER.

No. 571,098. Patented Nov. 10, 1896.

Witnesses
J. F. Coleman
E. A. Finnell

Inventors
John Sharpe
Jose Alexander Banfield
by Wm. H. Finnell
attys.

(No Model.) 6 Sheets—Sheet 4.

J. SHARPE & J. A. BANFIELD.
CASH REGISTER.

No. 571,098. Patented Nov. 10, 1896.

Witnesses
J. H. Coleman
E. A. Finnel

Inventors
John Sharpe
Jos. Alexander Banfield
by Wm H. Finnel
atty.

(No Model.) 6 Sheets—Sheet 5.

J. SHARPE & J. A. BANFIELD.
CASH REGISTER.

No. 571,098. Patented Nov. 10, 1896.

Witnesses
J. P. Coleman
E. A. Fincel

Inventors
John Sharpe
Jos. Alexander Banfield
by W. F. Fincel
Attys.

(No Model.) 6 Sheets—Sheet 6.

J. SHARPE & J. A. BANFIELD.
CASH REGISTER.

No. 571,098. Patented Nov. 10, 1896.

Witnesses
Inventors
John Sharpe
Jos. Alexander Banfield
by Wm. H. Fincuel
Atty.

THE NORRIS PETERS CO., PHOTO-LITHO., WASHINGTON, D. C.

United States Patent Office.

JOHN SHARPE AND JOSE ALEXANDER BANFIELD, OF OTTAWA, CANADA, ASSIGNORS TO DAVID MacLAREN, OF SAME PLACE.

CASH-REGISTER.

SPECIFICATION forming part of Letters Patent No. 571,098, dated November 10, 1896.

Application filed December 24, 1895. Serial No. 573,198. (No model.) Patented in Canada May 7, 1896, No. 52,212.

*To all whom it may concern:*

Be it known that we, JOHN SHARPE and JOSE ALEXANDER BANFIELD, subjects of the Queen of Great Britain, residing at Ottawa, in the Province of Ontario, Canada, have invented a certain new and useful Improvement in Cash Registers, Indicators, and Recorders, (the same having been patented in Canada May 7, 1896, No. 52,212,) of which the following is a full, clear, and exact description.

This invention relates to that class of machines or apparatus commonly known as "cash-registers," and the object of the invention is to produce a machine or apparatus by means of which money transactions may be registered, indicated, and recorded simultaneously.

Without attempting to state in detail those various parts, improvements, and combinations which constitute our invention, it may be observed that the invention comprises elements and groups of elements whereby, for example, a cash transaction may be registered and indicated and also recorded, and thereafter all succeeding similar transactions may be likewise registered, indicated, and recorded, and in addition the totals of the successive transactions registered. Briefly stated, the registering mechanism comprises a series of wheels bearing figures from "0" to "9," both inclusive, which are capable of individual operation in order to register the successive transactions, and which operate in combination with a total-adder. The prime mover of the registering-wheels comprises as many banks of keys as there are registering-wheels, each of the banks of keys being numbered correspondingly with the registering-wheels. The indicating mechanism comprises series of tablets corresponding in number with the banks of keys, and bearing similar indicia and operated simultaneously with the registering mechanism and from the same prime mover. The recording mechanism, which derives its movements from the same prime mover as and successively or synchronously with the movements of the registering mechanism and the indicators, comprises a check-slip, band, or ribbon, upon which, among other things, are printed the amount of the transaction and its character, and also a slip, band, or ribbon upon which is printed the amount of each successive transaction and such other details in connection therewith, as, for instance, the character of the transaction or an indicia of the salesman, as may be desired. This last-named ribbon with its printed items is stored in the machine as its record is made, for use by the proprietor for comparison and in checking, while the first-named ribbon has its printed items of information so disposed that at the completion of registration and recording of each individual transaction a check or ticket bearing such record may be cut off automatically by the same operation of the machine, to be delivered to the customer.

Having thus stated the principle of our invention, we will proceed now to describe the best mode in which we have contemplated applying that principle, and then will particularly point out and distinctly claim the part, improvement, or combination which we claim as our invention.

Figure 2:
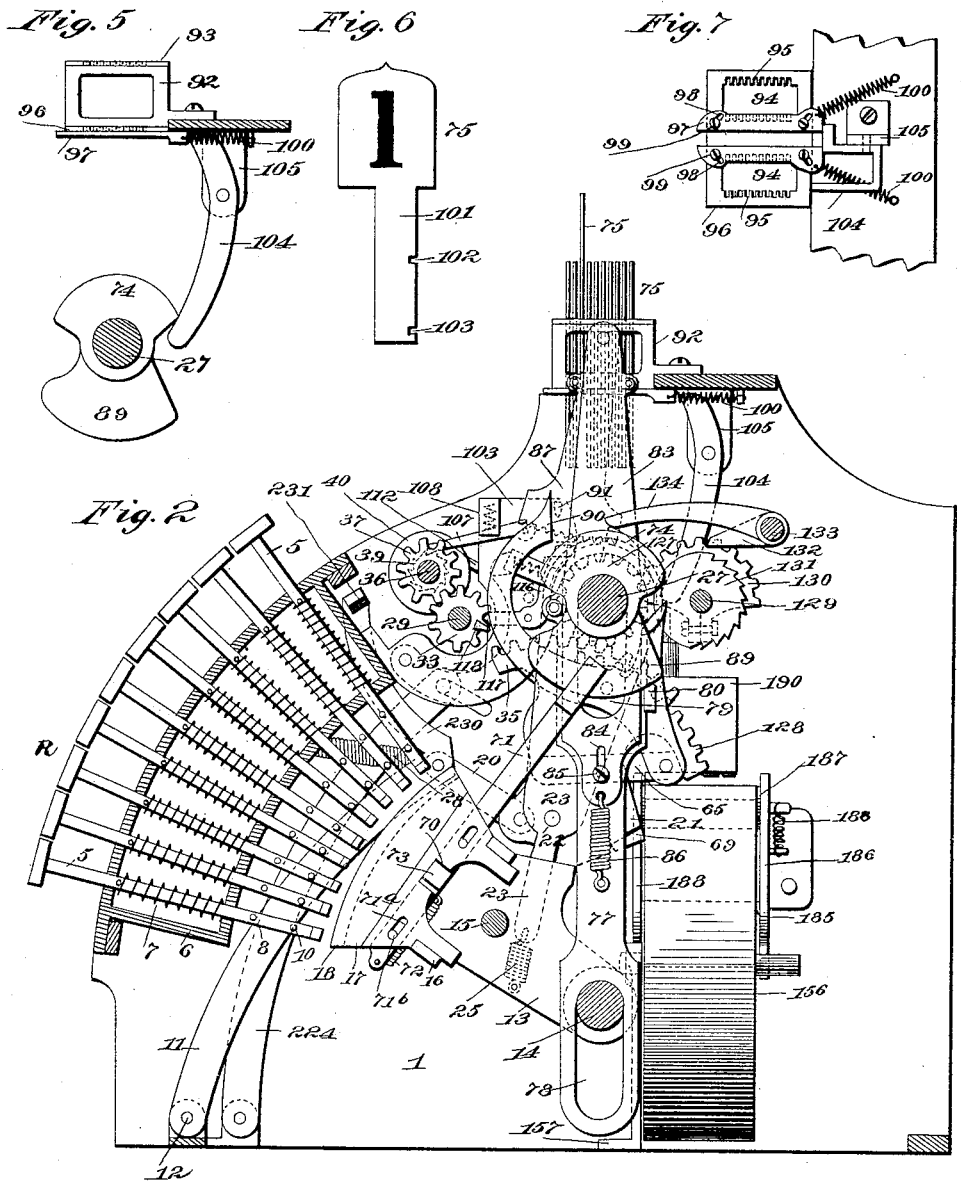
Figure 3:
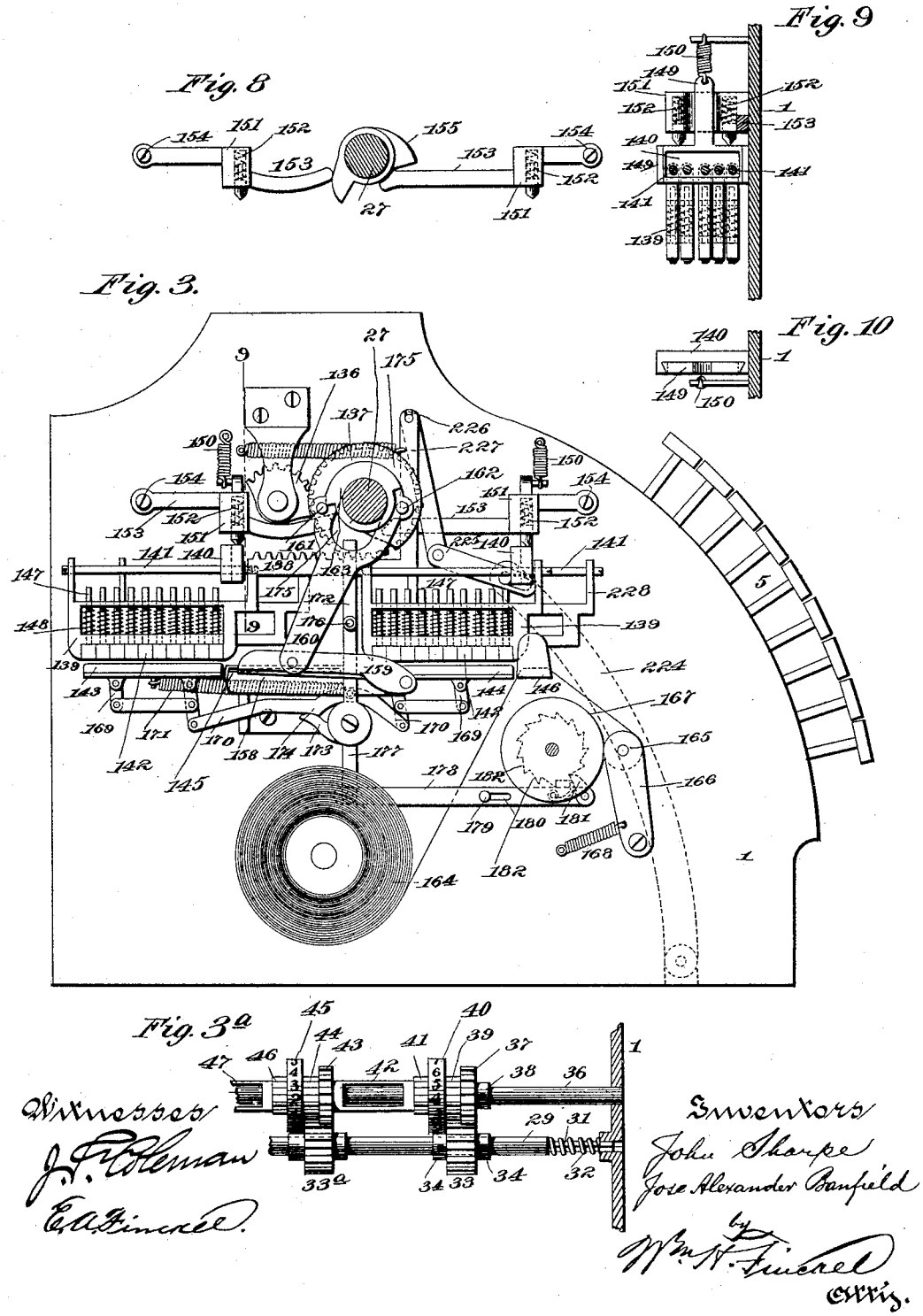
Figure 4:
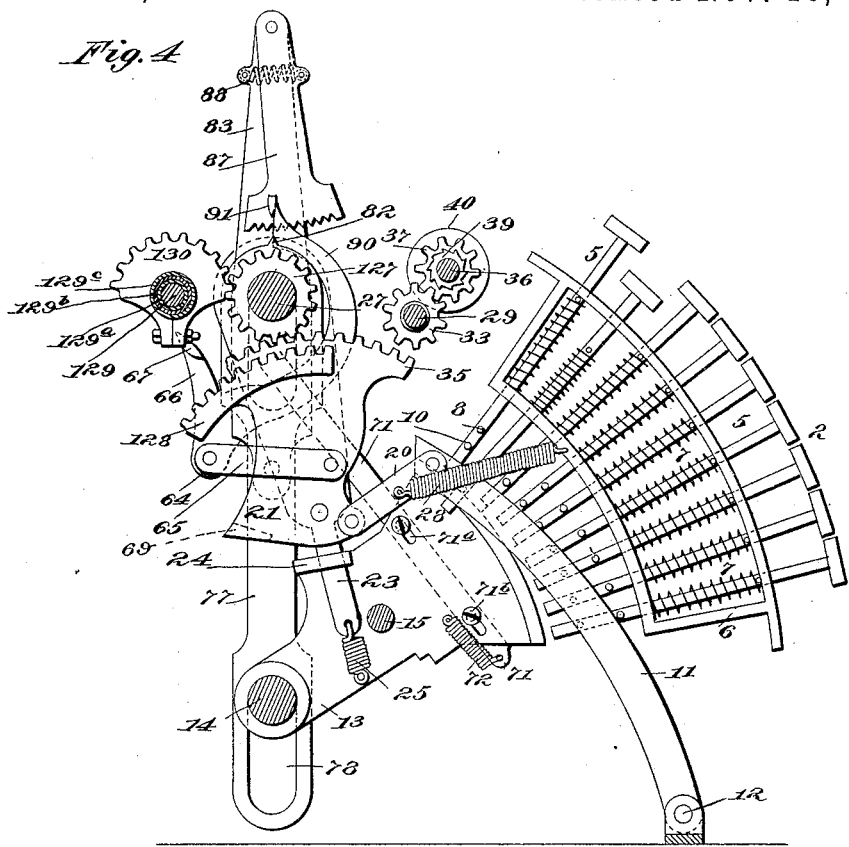
Figure 11:
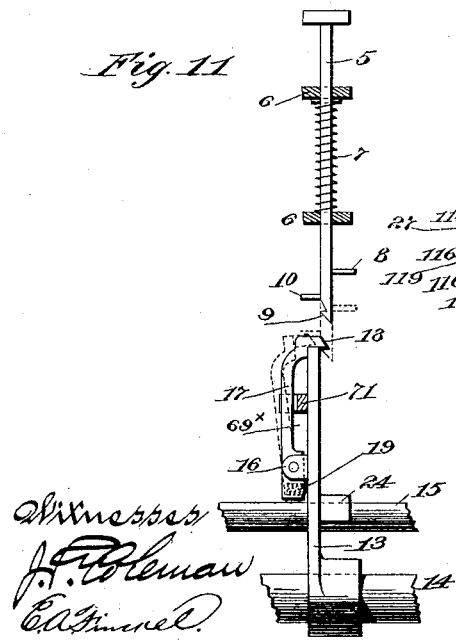
Figure 12:
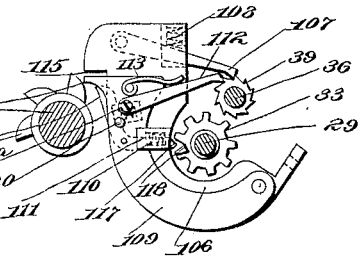
Figure 13:
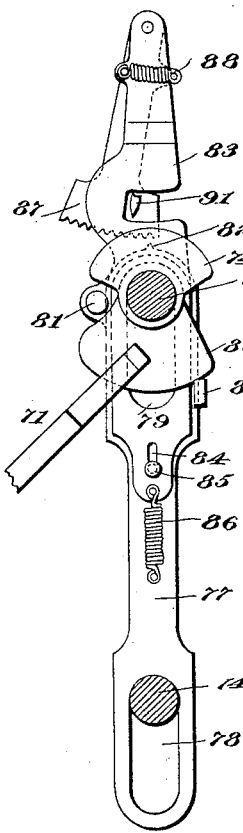
Figure 15:
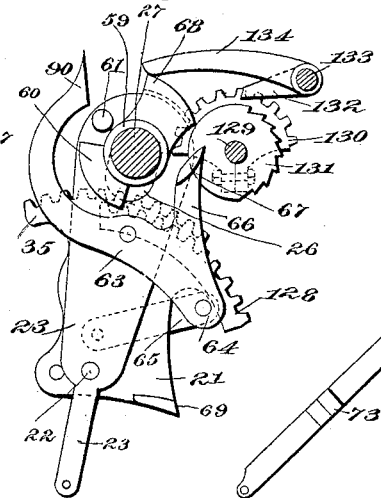
Figure 14:
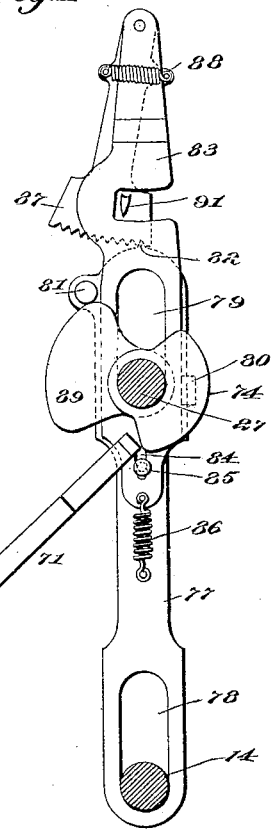
Figure 16:
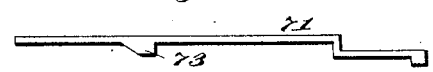
Figure 17:
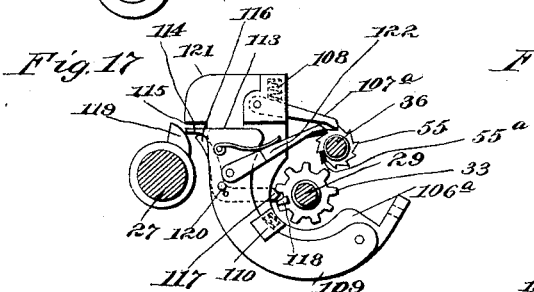
Figure 18:
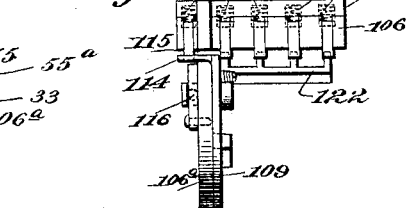
Figure 19:
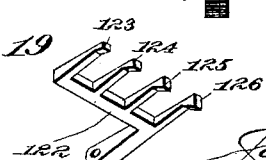
Figure 20:
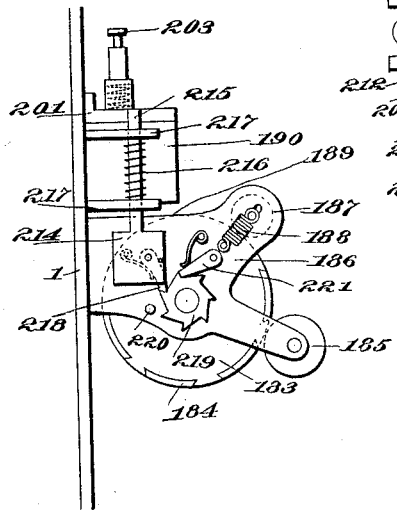
Figure 21:
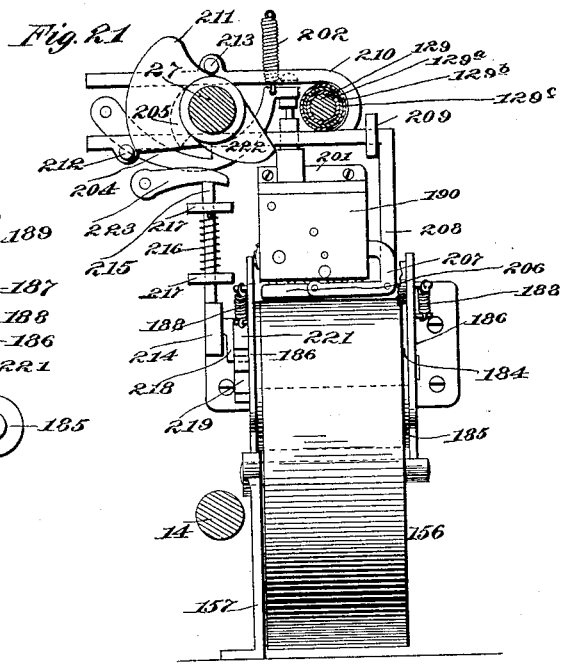
Figure 22:
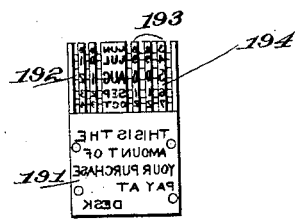
Figure 23:
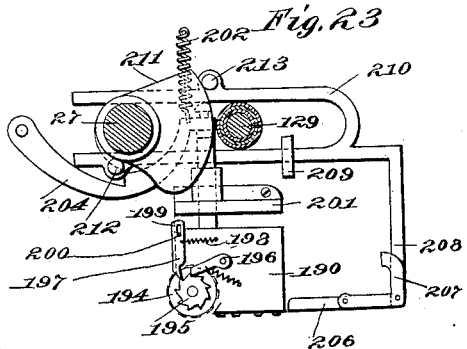
Figure 24:
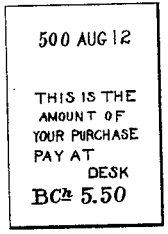

In the accompanying drawings, illustrating our invention, in the several figures of which like parts are similarly designated, Figure 1 is a plan view with the casing removed showing the parts in normal position. Fig. 2 is a partly-sectional side elevation looking at the right-hand end of the machine. Fig. 3 is a side elevation looking at the left-hand end of the machine. Fig. 3ª is an elevation of part of the registering mechanism. Fig. 4 is a vertical section taken in the plane of line 4 4, Fig. 1, and looking toward the right-hand side of the machine and showing the parts in position consequent upon the depression of one of the keys. Fig. 5 is a side elevation of a part of the indicator-operating mechanism. Fig. 6 is an elevation of one of the indicator-tablets. Fig. 7 is a bottom plan view of a part of the indicator-operating mechanism. Fig. 8 is an elevation of part of the printing mechanism. Fig. 9 is a sectional elevation taken in the plane of line 9 9, Fig. 3, and looking toward the rear of the machine. Fig. 10 is a plan view of Fig. 9, omitting the plunger-head. Fig. 11 is an elevation showing a key-rod and its supports in conjunction with the key-locking or detent mechanism. Fig. 12 is a side elevation in detail, showing one of the carrying devices. Fig. 13 is a side elevation of part of the tablet-selecting mechanism, showing the same at normal; and Fig. 14 is a similar view of the same mechanism, showing it at the completion of its upward stroke. Fig. 15 is a side elevation of a portion of the prime mover with the parts in the position they will be given by the depression of a key. Fig. 16 is a plan view of the slide for releasing the key-rod detent. Fig. 17 is a sectional side elevation of the other form of carrying device, and Fig. 18 is a rear elevation of this last form of carrying device, and Fig. 19 is a perspective view of the pawl or dog used in connection with this last-named form of carrying device. Fig. 20 is an end elevation showing a part of the numbering and dating apparatus and the cylinder for printing on the back of one of the record-ribbons and its adjuncts. Fig. 21 is a side elevation looking in the same direction as in Fig. 2 with some parts in section and showing the ticket or check-slip printing mechanism, the parts being in position for inking the printing surfaces. Fig. 22 is a bottom plan view of the dating and numbering stamp. Fig. 23 is an elevation of the parts shown in the upper portion of Fig. 20 and a portion of the outer casing of the dating and numbering stamp removed and with the inking-pad shifted as it will be in the act of printing. Fig. 24 is an enlarged diagram of one of the printed tickets or checks.

Without thereby limiting our invention we will proceed now to describe the same, as illustrated in the drawings aforesaid.

The standard-plates 1 1 may be of metal and of any approved form adequate to receive and support the mechanism hereinafter described, and these standard-plates are connected by suitable cross-pieces, as may be necessary.

For purposes of illustration we have shown a machine having four banks of keys, but we wish to be understood at the outset as not limiting our invention to that or any other number of banks of keys, the multiplication of such banks of keys being largely a matter of multiplication of various groups of mechanisms, hereinafter described.

The first three banks of keys, designated respectively 2, 3, and 4, comprise similar mechanisms, and therefore the description of one will suffice for all.

In the illustrations the banks of keys 2, 3, and 4 and their several associated mechanisms represent, respectively, cents, dimes, and dollars of American currency, and the keys are nine in number, and the finger-pieces, number-plates, or buttons of the several banks are inscribed, the cents-bank from "1" to "9," the dimes from "10" to "90," and the dollars from "$1" to "$9," respectively. Each key comprises in addition to its button or finger-piece a non-rotatable rod 5, arranged in bearings in a frame 6 and having a return-spring 7, a laterally-projecting pin 8, and a terminal hook or barb 9. Each key-rod is also provided with another laterally-projecting pin 10, which is hereinafter referred to as a "stop-pin," as will presently appear.

11 is a rock-lever, having its pivot 12 at the bottom of the machine or other fixture and projecting upwardly into the path of movement of the several laterally-projecting pins 8 of the several key-rods and normally in contact with the laterally-projecting pin 8 of the lowermost key-rod, whereby its forward movement is arrested, although such forward movement may be arrested by other means.

13 is a plate secured to a rod 14, which is supported in the standard-plates and also secured to a rod 15, similarly supported. The plate 13 is provided with opposite lugs or ears 16, in which is pivoted a segmental detent 17, having a beveled projecting end 18, which normally extends over the segmental end of the plate 13 and is held yieldingly in that position by means of springs 19, which are arranged in pockets in the ends of the detent 17 below its pivot and bearing against the plate 13.

Now as the finger-key is depressed in the use of the machine it must be depressed so that its hooked end will pass by the projecting beveled end of the detent until it is arrested by its stop-pin 10, at which time the said finger-rod will be engaged by the said detent until positively released, as herein described. In the use of the machine each selected finger-rod is depressed and engaged in a similar manner to indicate a given transaction. The rock-lever 11 is connected by a link 20 with the short arm of a segmental toothed rock-lever 21. It will be observed that the rock-lever is curved rearwardly from the key-bank, and that the pins 8 on the key-rods are at different distances from such rock-lever when the machine is normal, (position of non-use.) This arrangement is planned upon the throw to be given the toothed segment by the depression of the respective keys, key 1 having a throw of nine teeth, key 2 having a throw of eight teeth, and so on up to key 9, the depression of which throws the segment one tooth. It is to be understood also that but one key in each bank is to be operated at a given time, and that if a second key in the same bank be inadvertently or otherwise operated the first one will be released and restored to normal. The operation of a single key in each bank may be effected simultaneously or successively. The rock-lever 21 is pivoted at 22 to a sliding frame 23, and this sliding frame in turn has its lower end projected through and guided in a loop 24 on the plate 13 and is secured to such plate by means of an interposed spring 25, which normally tends to draw it down. At its upper end this sliding frame is provided with an elongated hole 26, by means of which it is supported upon the main shaft 27, and has a movement on said main shaft in the direction of its own length. The toothed segment is normally held is a retracted and inoperative position by means of a spring 28.

29 is a dead-spindle, secured in the standard-plates, and having one end 30 to slide in a boss on the standard in which it is supported and shouldered at its other end 31, and having a coiled or other spring 32 interposed between said shoulder and its bearing in the adjacent standard-plate. Upon this dead-spindle 29 are arranged loosely the idler-pinions 33 33$^a$ 33$^b$, which are held in place by the collars 34 34, each of said idler-pinions in the instance shown, having ten teeth and there being one pinion for each bank of keys. As will presently appear, these pinions are operated by the toothed segments 21 and by the teeth 35 on said toothed segments. A dead-spindle 36 is arranged in the frame parallel with the spindle 29 and above and in advance of it, and upon this spindle 36 are arranged a series of registering devices as follows:

37 is a pinion normally in mesh with the pinion 33 and held in place against endwise displacement by means of a collar 38, fixed to the spindle 36. This pinion has secured to it a ratchet 39, and connected and moving with the ratchet is a registering digit-wheel 40, on whose face is inscribed the figures "0" to "9" in succession. The pinion 37, the ratchet 39, and the digit-wheel 40 move together. Next to the digit-wheel and loose on the spindle 36 is a ratchet 41, and this ratchet has secured to it a yoke 42, which carries a pinion 43, to which again is secured a ratchet 44, and to this last-named ratchet is secured a digit-wheel 45. Next to the digit-wheel 45 is a ratchet 46, which is connected with the yoke 47, to which is secured a pinion 48, and to this last-named pinion is secured a ratchet 49, and to this ratchet 49 is secured a digit-wheel 50. The digit-wheel 40, which may represent units or cents, derives its motion from the idler-pinion 33. The digit-wheel 45, which may represent tens or dimes, derives its motion from the idler 33$^a$, and the digit-wheel 50, which may represent hundreds or dollars, derives its motion from the idler 33$^b$. Also mounted upon the dead-spindle 36, and next adjacent to the digit-wheel 50, are the digit-wheels 51, 52, 53, and 54, between which and secured to them, respectively, are the individual ratchets 55, 56, 57, and 58. The digit-wheels 40, 45, and 50 are the registering devices by which each individual transaction is registered, and the digit-wheels 51, 52, 53, and 54, which operate in conjunction with these wheels, as will presently appear, constitute the total-adder.

On the main shaft 27 is secured a collar 59, which is provided with a cam 60, and this cam coöperates with a pin 61 on the sliding frame 23 by the rotation of the said shaft, and said shaft may be rotated by a crank-handle 62 or other appropriate means, the motion of which is automatically arrested and the handle held by a spring-pressed stop 62$^a$, pivoted to the standard-plate and pressed outwardly therefrom into the path of movement of the handle by the spring 62$^b$. Supposing that a given transaction requires the use and depression of a key in each of the three banks of keys, and that these several keys have been depressed and held in such depressed position as hereinbefore described, and that the toothed segments 21 have been advanced toward the idler-pinions the total number of teeth less the corresponding numbers on the keys depressed, then by the rotation of the main shaft the shoulders on the respective cams will engage the pins 61 on the respective sliding frames and will lift the said sliding frames and thereby cause the respective toothed segments to engage the idlers. The toothed segments and the idlers now being in engagement, the said toothed segments are rocked forward, in order to rotate the idlers, by the following mechanism: Each sliding plate 23 has pivoted to it a lever 63, one arm, 64, of which is connected by link 65 with the forward side of the toothed segment 21. Another arm, 66, of this lever 63 has a cam-faced lug 67, which lug projects laterally from said arm into the path of movement of an undercut cam 68 on the collar 59, so that as said main shaft revolves said cam 68 is brought into contact with the upper face of the cam-faced lug 67, and rocks the said lever upon its pivot, thereby, through link 65, forcing forward the toothed segment and rotating the idler-pinion a distance equal to the number of teeth represented by the key which has been depressed. In each operation of each toothed segment 21, by the means just described, it is to be understood that the said segments are forced forward to their fullest extent, being checked by suitable stops, such as 69, on the toothed segment 21, which may come in contact with the sliding plates 23 for this purpose, this checking of the segments serving also suddenly to arrest the momentum of the digit-wheels. In order that this operation may be understood clearly, it is to be remembered that by the depression of the key its respective toothed segment is forced forward its full throw less the number of teeth represented by the number of the key depressed, and so the subsequent movement of the toothed segment, effected by the rotation of the main shaft, completes the movement of the segment through these remaining teeth. As the main shaft continues to rotate, the cam 68 will have passed by and released the cam-lug 67 and the lever 63, and the cam 60 also will have passed out of contact with the pin 61, thus allowing the sliding frame 23, under the action of its spring 25, to fall back to normal, carrying with it the toothed segment 21 out of engagement with the idler, but not restoring the said toothed segment or the depressed keys to normal. The depressed keys and their respective toothed segments are detained in the position in which they are thus left and are restored to normal by the following mechanism:

The detent 17 is provided with a transverse recess 69×, Fig. 11, and a notch 70, Fig. 2. In this recess is arranged a slide 71, which is normally projected upwardly and rearwardly relatively to the detent by means of a spring 72, which is fixed at one end to the said slide and at its other end to the detent. This slide has a beveled lug 73, which coöperates with a similarly-constructed surface in the notch 70. The slide may be connected with the detent by means of slots 71$^a$ and pins or screws 71$^b$. The slide 71 projects into the path of movement of a cam 74 on the main shaft, and this cam is suitably timed with relation to the operations of the cams 60 and 68 to depress the said slide, and by means of its cam-faced lug 73 to retract the detent 17 and pull its end 18 out of engagement with the hooked end of the depressed key-rod. The key-rod then is free to be returned to normal position by its spring 7, and the rock-lever 11, having been released from the pressure of the depressed key, is free to be returned to normal by the action of the spring 28, which spring also restores the toothed segment to normal. As the cam 74 completes its action upon the slide 71 the said slide is free to be returned to normal by its spring 72, thus restoring the detent 17 to normal and in position to engage the key that is next depressed.

As the toothed segments are restored to normal their movement will cause the links 65 to tilt the levers 63, so as to cause the arms 66 of said levers to approach toward the shaft 27, thus bringing the lugs 67 of said levers within the undercut portions of the cams 68 and out of the paths of movement of the several outer active faces of such cams. When the key is depressed, the initial movement thereby imparted to the appropriate toothed segment will shift the lever 63 of that mechanism, as in Fig. 4, and place its lug 67 in the path of movement of the active end of the cam 68 of that set of mechanism, and said lever alone will be vibrated, the other similar levers remaining uninfluenced and not acted upon by the rotation of the shaft.

By these series of operations just described the several digit-wheels corresponding to the several keys that have been depressed have been moved to register numbers corresponding with numbers on the keys depressed.

So far as described the mechanism will effect merely an indication of the value represented by the keys depressed; but the registering-wheels have a larger function than this, as will presently appear. An operation performed conjointly with the operation of turning the digit-wheels is the elevation into sight of the indicator-tablets 75. There are as many series of tablets 75 as there are banks of keys in the machine, and each series of tablets is controlled by the operation of its appropriate key-bank, there being one more tablet in each series of tablets than there are keys in each bank, and these extra tablets, in the instance shown, contain, respectively, a dollar-mark ($) and naught, (0).

77 is a slide having at opposite ends the elongated openings 78 and 79, which embrace, respectively, the rod 14 and the main shaft 27, so as to permit the said slide to have a rectilinear movement in the direction of its length upon these members. This slide is provided with a lug or projection 80 on one side, and also a pin 81 on the same side, and also at its upper end a tooth 82.

83 is a slide having an elongated opening which embraces the main shaft, and which is arranged alongside of the slide 77 and secured to it by a slot 84 and pin 85, and having a yielding union with relation to said slide 77 by means of a spring 86. The slide 83 is provided with a pivoted segmental rack 87, which is held in normal position by a spring 88, which is secured to the slide 83. The lug 80 and the pin 81 on the slide 77 are arranged in the path of movement of a cam 89 on the main shaft. By the depression of a key and the consequent movement of the toothed segment 21 the lever 63 will be moved so that an arm 90 of said lever, which projects up over the shaft and into a plane parallel with the lower end of the rack 87, will come into contact with a projection 91 on said rack and move said rack rearwardly, so as to bring that one of its teeth corresponding with the finger-key that has been depressed into alinement with the tooth 82 on the slide 77. The tooth 82 is normally held out of engagement with the rack by the cam 89 engaging the lug 80 and depressing the slide 77. Now upon the rotation of the main shaft the cam 89 is carried away from the lug 80, thus releasing the slide 77 and permitting the spring 86 to draw the slide 77 upward into engagement with the appropriate tooth or notch in the rack 87, and so retain said rack. As the main shaft continues to rotate in the same direction the said cam 89 engages the pin 81 and lifts both slides bodily. It will be understood that the before-described arrangement of the rack 87 and its location in such arrangement by tooth 82 serves to present the lug 91 beneath a tablet corresponding in indicia with the key that has been depressed, and consequently upon the described upward movement of the slides that particular tablet will be exposed to view. In view of this function of the rack we herein refer to it as a "tablet-selecting" device.

In the instance shown four series of tablets are arranged in two boxes, each of which boxes is constructed as follows: There is a top plate 93, having two openings 94, the opposite edges of which are provided with notches or guideways 95, and there is a bottom plate 96, which has corresponding openings 94 and notches or guideways 95. Beneath the bottom plate are arranged a pair of locking-slides 97, which are secured to said bottom plate by oblique slots 98 and pins 99, and are normally drawn away from one another by means of springs 100, so as to throw the said locking-slides across the adjacent notches. The tablets are made of one piece, with a stem 101, having in one edge two notches 102 and 103. The opposite edge of the stem is made plain and straight, and is adapted for movement in the outer series of notches in the top and bottom plates, so as to bring the notches 102 and 103 opposite the locking-slides, as will now appear. When the machine is at normal, the notches 102 are engaged by the locking-slides 97 97 and the tablets locked in position. A lever 104 is pivoted in connection with each box, as upon a depending lug 105, and at that end of the locking-slides at which their springs are engaged. The lever for each box is arranged in the path of movement of the cam 74 on the main shaft 27, so that as the said cam, in the rotation of the said shaft, comes into contact with the lower end of the said lever 104 it moves its upper end toward the locking-slides, and moving them lengthwise causes them to approach one another by reason of their oblique slots, and thus disengages them from the tablets and consequently permits the movement of the selected tablets into position of exposure. The cam continuing its motion and passing the lever 104 permits the locking-slides under the strain of their springs to separate and engage the lower notch of the elevated or selected tablet, holding such tablet in elevated position until the said locking-slides are again operated by another operation for the selection of tablets.

The next group of mechanism to be described is the carrying device, and we use this term in its arithmetical sense, as in addition. In the selected illustration of our invention we have shown three brackets of substantially the same construction and differing in the particulars hereinafter pointed out. The brackets, which are arranged in conjunction with the digit-wheels 40, 45, and 50, may be designated 106, and they are secured to the frame 6 and extend rearwardly beneath the idler-wheels and upwardly into alinement with the digit-wheels. At their upper ends these brackets are provided with dogs 107, which engage the rachets 39, 44, and 48, which serve simply to prevent back motion of the registering mechanism. These dogs are held in yielding engagement with these ratchets by means of the springs 108, which may be arranged in suitable pockets in the said brackets. Each bracket is provided with a pivoted pawl-carrier 109, which is acted upon by a spring 110, arranged in a pocket in a lug 111 on the bracket 106. This pawl-carrier has pivoted to it the pawl 112, which engages the ratchet 41, the ratchets 41 and 46 having similar pawls. The pawl 112 is normally held in engagement with its ratchet by the spring 113. The pawl-carrier 109 has an offset-lug 114, which extends laterally underneath a shoulder 115 on its bracket, and this lug 114 is engaged periodically by means of the tripping device or lever 116, which is pivoted to the bracket on the side opposite that on which the pawl-carrier is pivoted. This tripping device is held normally in engagement with the lug of the pawl-carrier by means of a suitable spring 116ª, Fig. 12. The toe 117 of the tripping device 116 extends into the path of movement of a laterally-projecting lug 118, arranged on the idler-wheels. This lug 118 is normally nine-tenths of a full revolution away from the tripping device 117, that is to say, it is just below the said tripping device and removed from it the distance of nine teeth out of ten on a ten-tooth wheel, and when the said idler is accomplishing a full revolution the said lug comes into contact with the said tripping device and vibrates it, and thus carries its upper end out of contact with the pawl-carrier, thus leaving the spring 110 free to act to force the said pawl-carrier rearwardly, whereby its pawl drops out of the notch of the ratchet in which it had rested and into a position to engage the next lower notch. Upon the further movement of the machine consequent upon the rotation of the handle 62 a cam 119, arranged upon the main shaft 27, comes into contact with a laterally-projecting pin 120 on the pawl-carrier and moves it forward against the tension of this spring, and consequently rotates the ratchet the distance of one tooth and so leaves it, the pawl-carrier meanwhile being sustained in its restored position by its tripping device 116 again coming into coöperation with the offset-lug 114. Bearing in mind now that the ratchets 41 and 46 are connected with the next succeeding digit-wheels of higher value, it will be seen that each complete revolution of the digit-wheel of lower value will be registered as one on the next succeeding digit-wheel of higher value.

In connection with the digit-wheel of highest value in the series of registering devices are the total-adder wheels, and the operating-ratchets for these total-adder wheels are controlled by a carrying mechanism of similar construction, excepting in the following particulars: That is to say, the bracket 106ª, Figs. 17 to 19, has a projection 121, in which are arranged as many detaining-pawls 107ª as there are ratchets, the ratchets 49, 55, 56, 57, and 58 serving in this case both as detaining and as motor ratchets, and the pawl-carrier is provided with a pawl 122, having four points 123, 124, 125, and 126 of irregular formation; that is to say, these pawl-points have their noses of progressively increasing depth from the ratchet 55 to the ratchet 58, said ratchets having complemental deep teeth or notches 55ª to coöperate with these pawl-points in well-known manner to provide for the successive progression of the several digit-wheels of this adding series, as the digit-wheels of lower denomination or value complete their several revolutions.

It will be observed that the several cams 119 are arranged upon the main shaft opposite the several pawl-carriers, (there being three pawl-carriers in the illustration shown,) and that these several cams are spaced apart, as indicated in Fig. 12, so as to operate in succession instead of simultaneously, in order that the addition or carrying may be effected; that is to say, the several pawl-carriers being operated successively, so that the motion from the one of lower value may be transmitted to the next one of higher value before the last-named one is operated by its appropriate cam, and so on throughout the series in progression.

In the operation of this carrying mechanism it will be understood that the digit-wheel representing cents may be operated any number of times less than and up to nine without effecting a carry to the digit-wheel representing dimes, but as soon as the digit-wheel representing cents has been operated to register more than nine cents, then the excess would be noted on the digit-wheel representing dimes, by virtue of the fact that the lug 118 on the idler-pinion of the cents digit-wheel would have been given a full revolution and consequently would have actuated or released the tripping device 116 and thus set the pawl 112, carried by the appropriate pawl-carrier 109, in position to turn the digit-wheel to which it is applied one space, so that said dimes-wheel will be moved one space. This transmission of motion from the digit-wheel representing cents to the digit-wheel representing dimes is, as will be understood, effected through the intervention of the yoke and the pinion and detaining-ratchet interposed between the cents-wheel and the dimes-wheel; and so, after the dimes-wheel has been rotated through a complete revolution, the sum will be carried to the dollars digit-wheel in like progression. So also when the dollars digit-wheel has been turned through a complete revolution its sum will be carried to the next succeeding digit-wheel of the total-adder, and so on through the series of wheels of such total-adder. Of course, if a single transaction represents dollars, dimes, and cents, all three of these digit-wheels will be moved simultaneously the number of teeth corresponding to the keys depressed, thus registering the amount corresponding to the keys depressed. So also if the transaction is expressed simply by cents and dimes those two wheels will be actuated simultaneously by a single rotation of the main shaft, and the dollars-wheel will remain normal if there be no carry or will be moved through an appropriate space if there be a carry. In the illustration of our invention herein shown the registering capacity is limited to nine dollars and ninety-nine cents; but it is obvious that its limit may be increased by the addition of appropriate digit-wheels and appropriate operating mechanism in the total-adder.

The next group of mechanism to be described is that relating to the recording of the individual transactions of the machine. Of this mechanism the banks of keys are again, in connection with the main shaft, the prime movers. The main shaft is supplied with a series of idler-pinions 127, which are arranged in alinement and to mesh with the toothed segments 128 on the toothed levers 21, the said toothed segments 128 being arranged below the teeth 35 of the said toothed levers, and normally out of engagement with the pinions 127. Parallel with the main shaft is a shaft 129, borne by the standard-plates and having a series of toothed segments 130, which are normally in mesh with the idler-pinions 127. There are as many idler-pinions, toothed segments 128, and toothed segments 130 as there are banks of keys, but the toothed segments 130, while all supported upon the shaft 129, have independent shafts in the nature of concentric sleeves $129^a$, $129^b$, and $129^c$, as shown more particularly in Fig. 1. Each of these toothed segments 130 is supplied with a ratchet 131, which, in conjunction with the dog 132, is designed to prevent back motion. The dogs 132 are mounted upon a rod 133, and these dogs have connected with them the arms 134, which project into the path of movement of the cam 68 on the main shaft 27, so that when the machine is at normal, as in Fig. 1, the arms 134 will be lifted so as to clear the dogs 132 from the ratchets 131, thus allowing those toothed segments 130 which have been operated to be returned to normal under the action of the springs 135, which are coiled about the respective shafts of the several toothed segments.

As the main shaft is rotated in the use of the machine to register, indicate, and record transactions the cams 68, passing from under the arms 134, permit the descent of the dogs 132 into engagement with the ratchets 131 to hold the individual ratchets in any position they may be given, in accordance with the following mechanism: The toothed segments 128 having been moved upwardly into engagement with the idler-pinions 127 it will be understood that upon the forward movement of the toothed levers 21 the idler-pinions themselves will be positively rotated by said toothed segments 128, and consequently the toothed segments 130, pertaining to the respective banks of keys that may have been actuated, will also be rotated through an arc corresponding with the arc of movement of the toothed levers 21. It is at the termination of this movement of these toothed segments 130 that the dogs 132 become operative to check back movement against the action of the springs 135. Each respective shaft of the toothed segments 130 has upon its far end a similar toothed segment 136, which toothed segments 136 mesh with the corresponding idler-pinions 137 on the main shaft, so that the motion imparted to the toothed segments 130 is transmitted through their shafts to the other toothed segments 136, and thence to the respective pinions 137. These pinions 137 mesh with an equal number of toothed racks 138, which form part of type-frames 139.

These type-frames 139 are supported in bearings 140 by means of their rods 141, so as to have a longitudinal sliding motion in said bearings. There are as many type-frames as there are banks of keys and such additional frames as may be necessary to perform all the functions desired in connection with the transactions to be recorded. In the illustration chosen there are five of these type-frames. Each type-frame contains a series of type 142 corresponding in number with the indicator-tablets. In the type-frames which are used in conjunction with the numerals to represent amounts there are ten types, designated from naught (0) to nine, (9,) inclusive, and since, as will presently appear, the recording apparatus is duplex in its character, and, as already stated, the type-frames are double, it will be understood that these type are in double series; that is to say, each type-frame carries two sets of corresponding type. Referring now to Fig. 3, the left-hand series of type is arranged over an inking-pad or other device 143 and the right-hand series of type is arranged over an inking-pad 144. Adjacent to the left-hand series of type is a stationary platen 145 and adjacent to the right-hand series of type is a stationary platen 146. The several types are mounted upon stems 147 in the type-frames, with their upper ends projecting above the upper portions of the type-frames and normally lifted by the springs 148. The projecting ends of the stems of the type are acted upon by the plunger 149, which is normally retracted by means of springs 150, and has a rectilinear movement in the bearings 140.

The plunger for the left-hand set and the plunger for the right-hand set of type are alike in construction, and each consists of a rectangular frame, as shown in Fig. 3, of the width of the several series of type, which is yieldingly connected with a head 151 by means of springs 152, which serve as cushions for the plunger to compensate for difference of thickness in the paper or other record ribbon which is used. Each head 151 is rigidly fitted to or made with an operating-lever 153, and this operating-lever is pivoted at 154 to a fixture, such as a standard-plate, and projects into the path of movement of a cam 155 on the main shaft. In order that the plungers of the two sets of type in each type-frame may be operated successively or simultaneously, if desired, by a single rotation of the main shaft for the purpose of recording at two distinct points a single transaction, we employ upon the main shaft a cam 155, having cam-faces set opposite the levers 153, which actuate the printing-plungers, the said cam serving to depress the said levers and thereby the plungers, and consequently the printing-type that may have been set in the path of movement of the said plungers by the rotation of the main shaft in the first instance. The plungers are retracted and their operating-levers carried back into normal by means of the springs 150. As the main shaft rotates it will be understood that the idler-pinions 137 will have moved forward the type-frames into a position to present the type corresponding with the character on the key depressed opposite the platens, so that that type and no other will be actuated by the descent of the plungers consequent upon the rotation of the shaft in indicating and registering the individual transactions.

One set of type in each type-frame, and in the instance shown the left-hand set of type, is designed to print the amount of the transaction and any other indicia on a check or ticket which is to be delivered to the customer. This ticket is supplied from a roll 156, mounted in a suitable stand 157 in the machine. The band or ribbon from this roll is first passed over a preliminary printing apparatus, presently described, and fed thence to the printing-type, and when it has received the impression from the printing-type it is by the further movement of the main shaft severed from the band by means of shears or a cutting device constructed and operating as follows: 158 is a stationary blade secured to the outer edge of the platen, and 159 is a pivoted blade complemental to the stationary blade, and this pivoted blade is connected by a plunger 160 to the main shaft. This plunger is simply a longitudinally slotted or forked plate mounted to straddle the main shaft and having the projecting pins 161 and 162, which coöperate with a cam 163, fast on the main shaft, by means of which coöperation of said cam and pins as the main shaft revolves the said plunger is first positively lifted and then depressed into conjunction with the stationary blade 158 to effect the severance of the ticket.

The shaft 27 in making its revolution carries around the cam 163, and one of the shoulders on said cam coming in contact with one of the pins on the plunger 160 lifts said plunger, and consequently the movable blade of the shears, and thereafter upon the further revolution of the shaft, coming in contact with the other pin of said plunger, depresses the said plunger and consequently closes down the movable blade of the shears.

A second roll of paper or other material in ribbon form, 164, is mounted in the machine, and this ribbon or band is passed over the platen 146 and is fastened to a storage-roll 165, which is mounted in a swinging frame 166. A friction-roller 167 is mounted parallel with the roll 165, and the roll 165 is kept in constant yielding contact with this friction-roll by means of the spring 168. Motion is imparted to the friction-roll, as will presently appear, but at this point we desire to state that the band passing from the roll 164 over the platen 146 is impressed by the type carried in the right-hand end of the printing-frame simultaneously with the impression of the ticket just before described, and as the printed band 164 is stored upon the roll 165 it becomes a permanent record for use in comparison or checking.

The inking-pads are supported upon pairs of links 169, and these links are connected by a yoke 170, which yoke is restored to normal by means of a spring 171, which keeps the inking-pads in contact with the type at normal.

Any suitable supports may be provided for the links and yoke, but we prefer that the links be loosely hinged at their lower ends to a cross-piece, which may be firmly secured to suitable brackets on the standard-plates. The yoke may be loosely hinged to the lower ends of the extended links.

172 is a rock-lever having a toe 173, which is in constant contact with a lump 174 on the yoke, so that by the vibration of the rock-lever its toe will lift the yoke and consequently move the inking-pads away from the type, the said inking-pads, as already described, being restored to contact with the said type by the action of the spring 171. The rock-lever 172 extends up toward the main shaft and into the path of movement of a cam 175, fixed upon and rotating with the main shaft. The rock-lever is provided with a pin 176, projecting laterally therefrom into the path of movement of the several type-frames and normally distant therefrom. As the rock-lever is acted upon by the cam 175 its first effect is to raise the yoke 170 and thus move the inking-pads from the type, and immediately thereafter the pin 176 acts upon all of the type-frames, excepting a special frame hereinafter described, and gives to said type-frames a preliminary movement which advances them so as to present their naught or zero marks or other primary signs, such as a dollar-mark, above the platens and under the plungers, this preliminary movement of the type-frames by the pin 176 occurring at that period of the movement of the main shaft when the toothed segments 21 and 128 are being moved up into position to engage their respective pinions. Thus the type bearing the dollar-mark, zero, or other similar sign is always brought into position to be used by the preliminary movement of the machine, no matter what transaction is to be recorded, and the same motion will have moved the ratchets 131 a distance of one tooth, thus allowing the dogs 132 to engage such tooth and thus hold the parts from back movement in that position ready to receive further movement if any finger-keys containing other signs have been depressed in the indication and registering of the transaction. It will be understood that the further movement of the type-frames is effected by the engagement of the pinions 137 with their racks 138.

The rock-lever 172 has a prolongation 177, to which is connected a link 178, which is supported on the standard-frame by means of a pin 179, playing in a slot 180 in said link, the said link bearing a spring-dog 181, which engages a ratchet 182 on the shaft of the friction-roll 167, in order to give said friction-roll a step-by-step motion. This motion of the friction-roll imparts to the storage-roll 165 a uniform movement, no matter what the accumulation of paper thereon may be.

Referring to Figs. 2, 20, and 21, 183 is a cylinder whose surface may be provided with a series (we have shown seven) of printing surfaces or plates 184, which may bear any suitable matter, such as a series of advertisements. In conjunction with this cylinder is an inking-roller 185, and the frame 186, in which said cylinder is mounted, contains a rotary platen 187, which is held in yielding engagement with the cylinder 183 by means of springs 188, or other suitable means. This cylinder by virtue of its yielding character, operating in conjunction with the cylinder 183, serves also as a feeding mechanism to move forward the strip from the roll 156.

The frame 186 contains a platen 189, and above this platen is arranged a printing mechanism 190, containing the following instrumentalities, namely: This printing device is in effect a numbering and dating hand-stamp, but its impression is made automatically by operation from the main shaft, as will presently appear. As shown in Fig. 22, it contains a printing-surface 191, which is fixed, but may be replaced, and it also contains a numbering and dating stamp or mechanism 192, which may be set by hand in any usual manner. This dating device comprises also the numbering device 193, composed of a series of three, more or less, wheels 194, with suitable ratchets 195 interposed, which ratchets are provided with back-stop dogs 196 and the operating-pawls 197. Two of the ratchets may be provided with deep teeth, and the pawls 197 will be correspondingly constructed. The pawls 197 may be provided with a spring 198, in order to hold them in engagement with their ratchets, and the said pawls are provided with a lengthwise slot 199, by means of which they have a longitudinal movement under the guidance of the pin 200. The movement of the pawls is effected by their being carried into contact with a stationary portion 201 of the printing mechanism, as will presently appear. This dating and printing mechanism just described is normally elevated by means of the spring 202 connected therewith in any suitable manner; and said dating mechanism is provided with a spring-pressed plunger 203, which extends up into the path of movement of a lever 204, and this lever is arranged in the path of movement of a wiper-cam 205, fixed upon the main shaft. At a predetermined point in the rotation of the main shaft this wiper-cam comes into contact with the lever 204, and the said lever acting upon the plunger 203 depresses the numbering, dating, and printing device, thereby impressing the portion of the strip from the roll 156 which may be under it, placing upon said strip the number and date of a transaction that is to follow the transaction the amount of which is being simultaneously printed by the type in the typeframes just previously described. As the dating device is released from the pressure of the wiper-cam it is restored to normal by the spring 202, and during such operation the pawls 197 are brought into forcible contact with the bracket 201 and the numbering mechanism is changed progressively. This dating and preliminary printing mechanism is inked by means of the pad 206, which is pivoted to an arm 207, which in turn is pivoted to a frame 208, said frame being borne in a bracket 209 from the standard-plate, and the said frame having a forked end 210, which straddles the main shaft 27 in the path of movement of the cam 211, which acts alternately upon the pins 212 and 213 on the forked end 210 of frame 208 to bring the inking-pad into inking position with relation to the preliminary printing device and to remove it from such position.

The operation of the inking-pad 206 is as follows: Bearing in mind that the said inking-pad is pivoted to the arm 207 (see Figs. 21 and 23) and that said arm is in the nature of an elbow-lever with its shorter member returned, so as to be brought against the printing mechanism 190 when the frame 208 is moved toward said printing mechanism, it will be seen that as the said frame 208 is so moved the said shorter member of the said arm 207 will be acted upon by the resistance of the said printing mechanism and the said arm 207 will be tilted upon its pivot and thereby cause a movement of the printing-pad 206 upward against the face of the type in the printing mechanism, as in Fig. 21. As the frame 208 is moved in the opposite direction, as in Fig. 23, the arm 207 will recede from the printing mechanism, and thereby allow the inking-pad to drop away from the face of the type. It will be remembered that Fig. 23 shows not only this position of the printing-pad, but it also shows the printing mechanism depressed for purposes of printing.

The printing-cylinder 183 has imparted to it a positive motion, first, to effect the feed of the strip from the roller 156, and, next, to present successively the various printing-surfaces 184 secured to its periphery. These surfaces 184 may contain the advertisements of different concerns or of different things, so that it would be necessary to move the printing-cylinder at each revolution of the main shaft a distance sufficient to bring into printing position a fresh printing-surface. This may be effected by a slide 214, having an upright stem 215, normally lifted by a spring 216 and arranged in bearings 217 on the standard-plate. This slide carries a pawl 218, which is adapted to engage a ratchet-wheel 219 on the spindle or shaft of the cylinder 183.

220 is a stop-pin for limiting the downward movement of the carrier-slide 214 to the distance of one tooth of the ratchet 219. Back motion of the cylinder is prevented by means of a detent or dog 221. The stem of the carrier-slide 214 is acted upon by a special cam 222 through the intervention of a wiper-plate 223, which latter we prefer to use so as to take off wear from the stem 215.

It will be understood, of course, that the advertisements referred to as being printed from the cylinder 183 are printed upon the back of the check or the side opposite that on which the date, number, and amount of the transaction are printed, and it is obvious, therefore, that this printing-cylinder, so far as it is a printing-cylinder, may be dispensed with without affecting the character of our invention.

In the fourth bank of keys (shown in Fig. 1) it will be observed that the first five keys, counting from the top, are inscribed "A," "B," "C," "D," and "E," and these are designed to designate clerks or salesmen in the establishment in which the apparatus is used, and the remaining four keys are inscribed "Ch," indicating "Charge;" "Pd," indicating "Paid out;" "Rd," indicating "Received on account," and "NS," indicating "No sale." The rods of the first five keys are provided with pins 8, which are of a length sufficient not only to take in the rock-lever 11 pertaining to that bank of keys, but also to take in a modified rock-lever 224, mounted alongside of and in the rear of the rock-lever 11 pertaining to that bank. This rock-lever 224 is connected at its upper end with a pivoted lever 225 on the outside of the standard plate, and this lever 225 is provided with a pin which plays in a slot 226 in an arm 227, rising from the fifth frame of the printing-frames, said last-named printing-frame being designated 228. This printing-frame has an equipment of printing-type, representing the letters A to E, constructed as are the type of the other printing-frames, which are operated by the same plungers, and it is moved back and forth into position to present a type bearing one or the other of the aforementioned letters by means of the operation of the lever 225, caused by the depression of one or the other of the keys bearing said devices, and the said frame 228 is normally retracted by means of the spring 229.

The operation of one of the keys A, B, C, D, and E may be effected entirely independently of the operation of either of the four remaining keys of that same bank, or may be operated conjointly with them. The type bearing the characters indicated on the four last-named keys, namely, "Ch," "Pd," "Rd," and "NS" are in one of the four typeframes first described, and it will be understood that the pins of the keys bearing the signs "Ch," "Pd," "Rd," and "NS" are located nearer the rock-lever 11 than the pins of the keys A, B, C, D, and E. There are tablets corresponding with the designations on this fourth bank of keys, but only that tablet will be displayed which represents the key which imparts the greatest throw to the lever 11.

It being recalled that the special lever 224 and its connections with the special printing-frame are the medium by which the printing-frame for the letters A, B, C, D, and E is put into position for printing, it remains to be said that the remaining keys of the same bank, namely, those keys containing the marks "Ch," "Pd," "Rd," and "NS" have their printing mechanism brought into position by a special toothed segment 128, which contains five teeth less than the corresponding toothed segment for the other three banks.

Referring now to Fig. 24, which represents the face of the printed ticket which is to be delivered to the customer, it will be seen that in addition to the standing matter that is printed upon each ticket said ticket has a ticket-number (500) and a date (Aug. 12) at one end, which are imprinted thereon by the primary printing apparatus, and also at the other end the character "B," which may serve to indicate the salesman, the character "Ch," which may stand for "charge," and the amount 5.50. The period-mark or decimal-mark is contained on the types which are operated by the bank of keys which manipulate the mechanism of the tens or dimes series. Such a ticket would represent a credit transaction, but if the transaction were a cash one, then instead of the character "Ch" there would be brought into alinement the dollar-mark ($) out of the fourth series of mechanisms by the initial movement of the rotary-shaft, and its connecting mechanisms, due to the advance movement of all of the printing-frames by means of the rocking lever 172 and its pin 176, as already described.

Of course the total-adder is designed to receive and register only the cash sales, while at the same time it is desirable to indicate and record all of the transactions, whether cash or credit, and in order to adapt the machine for the indication and recording of credit sales, it is necessary to throw out of gear the total adder, and this is accomplished through the medium of the sliding spindle 29. It will be observed that the pinions 33, 33ª and 33ᵇ are double the width of the pinions 37, 43, and 48, so as to admit of the spindle 29 being slid to the right, Fig. 3ª, without coming out of mesh with the last-named pinions, and the toothed segments 35 are arranged in the line of the left-hand side of these pinions 33, 33ª, and 33ᵇ, and consequently when the said spindle has been moved it has carried the said pinions 33, 33ª, and 33ᵇ out of mesh with and out of the path of movement of their operating segments 35, and consequently the registering mechanism becomes inoperative without affecting the operativeness of either the indicating mechanism or the recording mechanism. This movement of the spindle 29 is effected, preferably automatically, by means of the rock-lever 11 of the fourth bank of keys, the said lever having rigidly affixed to its upper end an arm 230, which extends upwardly and is provided with a beveled face 231, which coöperates with a complemental bevel-faced lug 232 on the said spindle 29. These cams 231 and 232 are spaced apart a distance equal to the greatest throw given to the rock-lever 11 by the operation of the keys bearing the marks A, B, C, D, and E, and are only brought together and in operative contact by the manipulation of either of the four remaining keys of that bank, namely, the keys bearing the marks "Ch," "Pd," "Rd," and "NS."

We have thus described that form of our invention illustrated in the drawings, but we wish to be understood as not confining our invention to mere details of construction or arrangement. To illustrate, one such alteration, clearly within the scope of our invention, is the application to each of the several type-frames of an operating mechanism the same as or similar to that described with relation to the frame 228; also, instead of using the double recording devices one or the other may be omitted, with a corresponding simplification of the printing mechanism. Again, the printing-cylinder is not necessarily employed. A machine containing merely the registering and indicating mechanisms is within our invention also.

What we claim is—

1. In a combined cash indicator, register and recorder, the combination of a main rotary shaft, a bank of depressible keys, having key-rods provided with laterally-projecting pins, a rock-lever arranged in the path of movement of the said pins, a toothed segmental lever with which the said rock-lever is connected, an indicator mechanism deriving a primary motion from the first movement of the rock-lever and an ultimate motion, to expose the indicator, from the rotation of the main shaft, a registering mechanism comprising rotary digit-wheels and pinions connected therewith, an idler-pinion for each wheel interposed between the respective pinions and segmental toothed levers, a slide upon which the segmental toothed lever is carried, means upon the main shaft to raise said lever into engagement with the idler-pinions, a rocking mechanism for such segmental lever actuated by the rotation of the said main shaft to move said segmental lever and thereby rotate the idler-pinions, a printing mechanism, a train of mechanism interposed between the printing mechanism and the main shaft and deriving motion from the latter and serving to select the printing mechanism in accordance with the keys depressed in the several banks and to impress the thus-selected printing mechanism upon a suitable band, strip or ribbon, the ultimate movements of the registering mechanism, the indicators and the recording mechanism being effected essentially simultaneously and by the same single rotation of the main shaft, substantially as described.

2. In a combined cash register, indicator and recorder, a registering mechanism capable of registering from the unit of lowest value upward indefinitely to the highest values, an indicator mechanism for exhibiting the value registered, and a recording mechanism capable of permanently inscribing the individual transactions indicated, combined with a bank of depressible keys having key-rods provided with laterally-projecting pins, rock-levers arranged in the paths of movement of the said pins, toothed segmental levers with which the said rock-levers are connected, a registering mechanism comprising rotary digit-wheels and pinions connected therewith, an idler-pinion for each wheel interposed between the respective pinions and segmental toothed levers, a slide for each of the segmental toothed levers, a main rotary shaft, and means upon said shaft to raise each of said levers as desired into engagement with its appropriate idler-pinion, and a rocking mechanism for each of such segmental levers, actuated by the rotation of the said main shaft to move said segmental lever and thereby rotate the idler-pinions, substantially as described.

3. The combination with a bank of depressible keys having key-rods provided with laterally-projecting pins, a rock-lever arranged in the path of movement of the said pins, a toothed segmental lever with which the said rock-lever is connected, a registering mechanism comprising rotary digit-wheels and pinions connected therewith, an idler-pinion for each wheel interposed between the respective pinions and segmental toothed levers, a slide upon which the segmental toothed lever is carried, a main shaft and means upon said shaft to raise said lever into engagement with the idler-pinions, and a rocking mechanism for such segmental lever actuated by the rotation of the said main shaft to move said segmental lever and thereby rotate the idler-pinions, substantially as described.

4. A bank of depressible keys having key-rods provided with laterally-projecting pins, means for transmitting the motion of the depressed keys to a distant part, such as a rock-lever, a slide carrying a locking-tooth, a main shaft, means interposed between the main shaft and the slide for placing the locking-tooth in position, a series of indicator-tablets, and tablet-selecting devices actuated by the slide-actuating mechanism and simultaneously with the movement of the slide, and means actuated by the main shaft to raise the indicator-selecting device and the indicator-tablet to expose the latter to view, substantially as described.

5. A series of indicator-tablets, a settable selecting device, a slide upon which it is mounted, a second slide with which the first-named slide is yieldingly connected and having a locking-tooth to engage the selecting device and hold it in given position, a main shaft, a cam on said main shaft acting upon the second slide to disconnect its locking-tooth from the selecting device, and adapted upon the further rotation of the said main shaft to release the second slide, and thereby permit the engagement of its locking-tooth with the selecting device after the said selecting device has been placed in position for use, and thereafter to raise both slides together with the selecting device and elevate the indicator-tablet into view, substantially as described.

6. The combination of a prime mover, a secondary mover, such as a rotary shaft, a registering mechanism, and an indicating mechanism, a toothed segment interposed between the prime mover and the registering mechanism, and adapted to be elevated into mesh with the registering mechanism, a slide upon which the toothed segment is mounted, a main shaft embraced by said slide, a cam on the main shaft coöperating periodically with said slide to lift it in order to bring the toothed segment into mesh with the registering mechanism, a vibrating three-armed lever pivoted to the slide, with one of its arms connected to the toothed segment, another of its arms extending into the path of movement of an indicator-selecting device, and its third arm arranged in the path of movement of a cam on the main shaft, the said selecting device, a locking-tooth for said selecting device operated to lock the said selecting device in the position to which it was moved by the three-armed lever, and a cam on the main shaft to elevate said selecting device to expose the selected indicator to view, substantially as described.

7. In a cash-indicator, the combination with the main rotary shaft the indicator-tablets and means to move them into position and to release them, of a locking mechanism comprising a locking-slide provided with a spring for normally projecting the same into engagement with the said tablets, a cam on the main shaft and a releasing device for said locking-slide actuated by said cam, substantially as described.

8. In a cash-indicator, a series of tablets arranged in a supporting-frame, guides in said supporting-frame to receive and space said tablets, the said tablets having one edge provided with a pair of notches, parallel locking-slides arranged upon the said supporting-frame and normally engaging one or the other of the notches in the tablets, and means to release the said tablets from the engagement of the said locking-slides, substantially as described.

9. In a cash-register, a series of rotary registering-wheels each capable of independent movement and all of successive or progressive movement so as to carry from one representing a low value to another representing a higher value, combined with a prime mover, a rotary shaft serving as an ultimate mover and a carrying mechanism for the wheels, comprising a ratchet connected with the wheels, a pawl for such ratchet, a pawl-carrier, a tripping device coöperating with such pawl-carrier, means to actuate such tripping device as its appropriate wheel completes a revolution, and a cam on the main shaft to restore the tripped pawl-carrier to normal and thereby actuate the registering-wheel of next higher value, substantially as described.

10. In a cash-register, a series of rotary registering-wheels successively representing units of increasing values and connected to turn progressively, combined with a prime mover, a secondary and ultimate mover including a rotary main shaft, pinions connected with the registering-wheels and periodically-active gearing interposed between the main shaft and the pinions of the registering-wheels, and including idler-pinions, an auxiliary tooth or lug on the idler-pinions, and a carrying mechanism comprising a pawl-carrier, a pawl thereon, a tripping-lever pivoted to the pawl-carrier and having its nose extended into the path of movement of the auxiliary tooth or lug on the idler-pinion to be engaged thereby at each complete revolution of such idler-pinion, and means to restore the pawl-carrier to normal, substantially as described.

11. In a cash-register, the combination with a series of rotary registering devices, and means to rotate them, of a carrying device consisting of a fixed frame, a pawl-carrier pivoted thereon, a spring-pawl on said carrier which is normally in engagement with the registering mechanism, a tripping-lever pivoted to the bracket and adapted normally to hold the said pawl-carrier in position to effect the normal engagement of the pawl with the registering mechanism and means for periodically vibrating the pawl-carrier, substantially as described 12. In a cash-register, the combination with the main rotary shaft and a cam thereon, of a series of depressible keys, a pivoted segmental detent having the projecting beveled end for engaging the depressed keys, normally held in the path of movement of the said depressed keys, and a slide for releasing the said detent and actuated by the cam upon the main shaft, substantially as described.

13. In an apparatus of the class described, having a series of banks of depressible keys, and a prime mover connected therewith of a series of type-frames, and types in said frames representing the keys and other arbitrary marks, an ultimate mover, and means interposed between it and the said frames to impart to all of said frames simultaneously a primary movement to bring into printing position such arbitrary marks, which may be the dollar-sign and the zeros, and other means actuated by the rotation of the shaft to advance the frames so as to present in printing position the types corresponding with the keys depressed, and other means also actuated by the rotation of the said shaft to cause the type so set to be impressed, substantially as described.

14. In an apparatus of the class described, having a series of banks of depressible keys, a prime mover, a main shaft and a recording apparatus deriving motion from the main shaft under the control of the keys depressed and comprising a check-strip or fugitive record-slip and a permanent record-slip and suitable means to advance them after the making of each successive record, and a printing mechanism for recording the transactions and any other facts in connection therewith, and including a series of duplicate type-frames each containing a duplicate set of types, means to impart an initial movement to all of said type-frames simultaneously, and means, deriving motion from the main shaft, for setting the type-frames in accordance with the keys depressed, and means to impress the types so set upon the respective record mediums, substantially as described.

15. In a machine of the class described, a series of banks of keys, and a recording mechanism controlled by the operation of the said keys, the recording mechanism comprising a series of type-frames containing types, and one of the banks of keys containing two sets of keys, between which and the series of type-frames is interposed a double or two-fold selecting mechanism either or both portions of which double or two-fold selecting mechanism may be operated at any given time for the purpose of selecting and assigning to position the type-frames containing the type which it is desired to impress, substantially as described.

16. In a machine of the class described, containing a main shaft, a cam thereon, and a printing mechanism of substantially the character described, by which a continuous slip may be printed in sections which are successively fed beyond the printing mechanism, combined with shears arranged just beyond the printing mechanism, and comprising a fixed blade and a pivoted blade, and a plunger having a forked end and interposed between said pivoted blade and the cam on the main shaft, whereby the said pivoted blade is caused to rise and descend at predetermined intervals and sever the printed card or ticket or check from the slip, substantially as described.

17. In a machine of the class described, a recording mechanism comprising a printing mechanism and a slip-feeding device which includes an intermittently-rotating printing-cylinder provided with a series of fixed printing-surfaces adapted to print upon the back of the slip, ticket, or check, substantially as described.

18. In a machine of the class described, the combination with a dating and numbering apparatus, of an inking mechanism comprising an inking-pad, an elbow-lever in which said pad is pivoted, a reciprocating yoke to which said elbow-lever is pivoted, a main shaft, and a cam on said main shaft coöperating with said yoke to move it beneath and from under the said printing device, the elbow-lever coming in contact with the printing device as the yoke is moved beneath it and thereby lifting the inking-pad into contact with the printing-surface and insuring the inking of the same, substantially as described.

19. In a cash register, indicator and recorder, the combination of the registering mechanism, which includes a spindle or shaft and gearing thereon by which the registering mechanism is rotated, the said gearing having the capacity of being shifted by bodily movement of the spindle or shaft into and out of operative position relatively to the registering device, an indicating mechanism, and a recording mechanism, and a series of banks of keys by operation of which a prime movement is instituted with relation to these several mechanisms, a shifting mechanism for the registering mechanism, and means to operate said shifting mechanism interposed between said gearing and some of the keys, substantially as described.

In testimony whereof we have hereunto set our hand this 16th day of December, A. D. 1895.

JOHN SHARPE.
JOSE ALEXANDER BANFIELD.

Witnesses as to signature of John Sharpe:
 WM. H. FINCKEL,
 E. A. FINCKEL.

Witnesses as to signature of Jose Alexander Banfield:
 EDMUND F. BURRITT,
 CHARLES C. HOWLETT.